United States Patent
Verelst et al.

(10) Patent No.: US 10,272,885 B2
(45) Date of Patent: Apr. 30, 2019

(54) WIPER BLADE ADAPTER UNIT

(71) Applicant: Robert Bosch GmbH, Stuttgart (DE)

(72) Inventors: Hubert Verelst, Tienen (BE); Jan Van Hoye, Tessenderlo (BE); Jan Bonroy, Heverlee (BE); Geert Jans, Maasmechelen (BE); Dominik De Rop, Lens-Saint-Remy (BE); Peter Sprafke, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 690 days.

(21) Appl. No.: 14/368,379

(22) PCT Filed: Nov. 20, 2012

(86) PCT No.: PCT/EP2012/073019
§ 371 (c)(1),
(2) Date: Jun. 24, 2014

(87) PCT Pub. No.: WO2013/097982
PCT Pub. Date: Jul. 4, 2013

(65) Prior Publication Data
US 2014/0325786 A1    Nov. 6, 2014

(30) Foreign Application Priority Data

Dec. 29, 2011 (DE) .......... 10 2011 090 099

(51) Int. Cl.
*B60S 1/38* (2006.01)

(52) U.S. Cl.
CPC ........... *B60S 1/3851* (2013.01); *B60S 1/3855* (2013.01); *B60S 1/3868* (2013.01); *B60S 1/3879* (2013.01); *B60S 2001/3898* (2013.01); *Y10T 29/49826* (2015.01)

(58) Field of Classification Search
CPC .... B60S 1/3855; B60S 1/3851; B60S 1/3879; B60S 1/3856; B60S 1/3858
See application file for complete search history.

(56) References Cited

U.S. PATENT DOCUMENTS

| 2008/0078051 A1* | 4/2008 | Herring | B60S 1/3851 15/250.001 |
| 2011/0088192 A1* | 4/2011 | Wunsch | B60S 1/38 15/250.351 |

FOREIGN PATENT DOCUMENTS

| CN | 1484591 A | | 3/2004 |
| CN | 101151180 A | | 3/2008 |
| CN | 101223063 A | | 7/2008 |
| DE | 102007012700 | | 9/2008 |
| DE | 102010001900 A1 * | 8/2011 | ............ B60S 1/3855 |

(Continued)

OTHER PUBLICATIONS

DE102010001900A1 (machine translation), 2011.*

(Continued)

*Primary Examiner* — Andrew A Horton
(74) *Attorney, Agent, or Firm* — Michael Best & Friedrich LLP

(57) ABSTRACT

The invention relates to a wiper blade adapter unit with a wiper blade adapter (10), which is provided for a connection to a wiper arm adapter and has at least one receiving area (12, 14) having at least one contact surface (16, 18) provided for fastening at least one carrier element (20, 22) of a wiper blade. The invention states that the at least one contact surface (16, 18) has a maximum length of 20 mm.

21 Claims, 3 Drawing Sheets

(56) References Cited

FOREIGN PATENT DOCUMENTS

| | | | |
|---|---|---|---|
| DE | 102010003645 | 10/2011 | |
| DE | 102010028102 | 10/2011 | |
| WO | WO 2008113616 A1 * | 9/2008 | ............. B23K 11/14 |
| WO | 2009077565 A1 | 6/2009 | |
| WO | 2011098372 | 8/2011 | |

OTHER PUBLICATIONS

International Search Report for Application No. PCT/EP2012/073019 dated Dec. 17, 2012 (English Translation, 3 pages).

* cited by examiner

WIPER BLADE ADAPTER UNIT

BACKGROUND OF THE INVENTION

A wiper blade adapter unit comprising a wiper blade adapter, which is provided for a connection to a wiper arm adapter and has a receiving area, via which a curved carrier element of a wiper blade is fixedly mounted, has already been proposed.

SUMMARY OF THE INVENTION

The invention relates to a wiper blade adapter unit with a wiper blade adapter, which is provided for a connection to a wiper arm adapter and has at least one receiving area having at least one contact surface provided for fastening at least one carrier element of a wiper blade.

The invention states that the at least one contact surface has a maximum length of 20 mm. As a result, the curved carrier element can be fixedly connected in a particularly advantageous manner and with only a minimum amount of upset to the wiper blade adapter. A "wiper arm adapter" refers in this context particularly to an adapter which has a contact area with a wiper arm component and is provided for furnishing a coupling area of the wiper arm component for coupling and/or contacting with a wiper blade adapter. The wiper arm component can preferably be fastened to a wiper arm or in a particularly preferable manner be integrally formed with the wiper arm. A "wiper blade adapter" refers in this context particularly to an adapter which has a contact area with a wiper blade component and, in a disassembled state of a wiper blade from a wiper arm, is captively connected to the wiper blade at least in one operating state and is provided for furnishing a coupling area of the wiper blade for coupling and/or contacting with a wiper arm adapter. Particularly specially designed and/or equipped should be understood by the term "provided". A "receiving area" refers particularly to an area in which a carrier element is mounted to the wiper blade adapter. By the term "carrier element", a spring rail should particularly be understood which transmits a wiping force from the wiper arm to the entire wiper strip and by means of the curvature thereof, which is greater than a maximum curvature of a vehicle window pane to be wiped, presses the wiper strip across the entire length thereof against the vehicle window pane and thus prevents the wiper strip from lifting off the vehicle window pane. The carrier element is preferably at least partially formed from a spring steel sheet. In a particularly preferable manner, the carrier element comprises at least one external coating consisting of plastic. A "fastening" is to be understood in this context as a fixed and captive connection which is produced by means of a suitable type of connection. In this regard, a "suitable type of connection" is to be particularly understood as a type of connection of two components, in particular the wiper blade adapter and the curved carrier element. In so doing, the type of connection is preferably designed as a welded connection, wherein other types of connection, such as, for example, an adhesively bonded connection, a form-locking connection, a clamp connection or other types of connection that seem useful to the person skilled in the art, are in principle conceivable. A "contact surface" is particularly to be understood as a surface of the wiper blade adapter on which the carrier element at least substantially rests and by means of which the carrier element can be fixedly connected to the wiper blade adapter. "Upset to the carrier element" refers particularly to a deflection of the carrier element out of the rest position thereof by means of which a pre-adjusted curvature and thereby a pre-adjusted spring force of the carrier element are changed. A "length of the contact surface" is particularly to be understood as an expansion of the contact surface parallel to a main extension direction of the wiper blade adapter.

The invention further states that the at least one contact surface has a maximum length of 15 mm and particularly preferably a maximum length of 7 mm. In so doing, the carrier element can be mounted to the wiper arm adapter with an advantageously small amount of upset.

In addition, the invention states that the at least one receiving area has a plateau which is provided for forming the at least one contact surface. The receiving area can thereby be constructed particularly robustly, wherein the length of the contact surface can advantageously remain short. A "plateau" refers particularly to a surface which is higher in one direction, in particular at least substantially perpendicular to the contact surface, than at least one further surface of the receiving area. In so doing, the higher surface of the plateau advantageously forms the contact surface. By the phrase "at least substantially perpendicular to the contact surface", it is particularly to be understood that the direction in which the plateau is higher differs by a maximum of 45 degrees, preferably by a maximum of 20 degrees and particularly advantageously by less than 5 degrees from a surface normal that is perpendicular to the contact surface.

The invention further states that the at least one receiving area comprises a base that differs in the height thereof by at least 0.5 mm from a height of the at least one contact surface. As a result, the plateau can be especially simply designed; and an advantageous free space can be created within the wiper blade adapter for the carrier element. A "base of the receiving area" is particularly to be understood as a portion of the receiving area which differs in height in relation to a lower edge of the wiper blade adapter, said portion particularly lying lower than the plateau of the receiving area. In so doing, the height of said portion of the receiving area advantageously differs by 0.5 mm, expediently by 0.8 mm and in a particularly advantageous embodiment by 1 mm.

The invention further states that the base of the at least one receiving area is spaced apart at a distance from a bottom side of the wiper blade adapter, said distance being less than a distance between the at least one contact surface and the bottom side of the wiper blade adapter. As a result, the receiving area can be particularly advantageously formed for the connection of the carrier element.

The invention furthermore states that the base of the at least one receiving area is connected via an oblique surface to the at least one contact surface. As a result, particularly the receiving area can be particularly simply designed. By the term "oblique surface", a surface is particularly to be understood which has an inclination greater than 0 degrees in relation to the contact surface and/or the base. In an especially preferable manner, the oblique surface has an inclination that lies in a range from 6 degrees to 30 degrees.

The invention further states that the length of the at least one contact surface is at least substantially a quarter of a length of the at least one receiving area. A particularly advantageous ratio of contact surface to receiving area can thereby be achieved. By "at least substantially a quarter of the length", it should particularly be understood that the length of the contact surface deviates by a maximum of 20% preferably 15% and particularly advantageously by a maximum of 10% from exactly one quarter of the length of the receiving area.

Furthermore, the invention states that the at least one contact surface has a width which at least substantially corresponds to a width of the at least one receiving area. As a result, the contact surface can be particularly simply and advantageously designed. By the phrase "at least substantially corresponds to the width", it shall be understood that the width of the contact surface deviates from the width of the receiving area by a maximum of 10%, advantageously by a maximum of 5% and particularly advantageously by 0%.

In addition, the invention states that the wiper blade adapter unit comprises at least one energy directing element which is disposed on the contact surface. As a result, material can be particularly advantageously provided that can be especially advantageously fused during a welding process. An "energy directing element" refers particularly to a raised portion. The raised portion is advantageously tapered and is provided for the purpose of being at least partially fused during a welding process.

The invention further states that the at least one energy directing element is provided for the purpose of being at least partially fused during a welding process. As a result, a tolerance compensation can be particularly advantageously achieved when welding the carrier element to the wiper blade adapter. "At least partially fused" refers particularly to the fact that the energy directing element is fused to such an extent when welding the carrier element to the wiper blade adapter that the spring rail is spaced apart from the bottom side of the wiper blade adapter at a defined distance. By means of the energy directing element, manufacturing tolerances can be easily compensated in an advantageous manner, namely in particular by virtue of the fact that the energy directing element can be fused to varying degrees for different wiper blade adapters having the same design in order to achieve a defined distance to the bottom side of the wiper blade adapter. In so doing, the energy directing element can be completely fused or, for example, only 10% thereof is fused.

The invention further states that the wiper blade adapter has at least one blind hole which is disposed above the at least one contact surface. The carrier element can thereby be particularly advantageously and simply welded to the wiper blade adapter. By the term "blind hole", a recess is particularly to be understood, which is bounded by a base. Particularly a through-hole is not be understood by the term "blind hole".

The invention furthermore states that the at least one blind hole is configured as an elongated hole. In so doing, a particularly simple positioning of a tool, in particular a welding tool, can be achieved within the blind hole relative to the contact surface. An "elongated hole" refers particularly to an elongated recess having a width which is substantially smaller than a length of the recess. Narrow sides of the elongated recess are preferably terminated by half-circles, the diameters of which correspond to a width of the recess. Longitudinal sides of the elongated recess run preferably parallel to one another, wherein said sides can be straight or can follow a curve, such as, for example, a circular arc. In a particularly preferable manner, the elongated hole has in this case a length of 5 mm and a width of 3 mm. In principle, other dimensions for the length and the width of the elongated hole that appear useful to the person skilled in the art are, of course, also possible.

In addition, the invention states that a base of the wiper blade adapter which delimits the at least one blind hole is provided for the purpose of being fused during a welding process. The carrier element can thereby be particularly advantageously welded to the wiper blade adapter. "Being fused during a welding operation" refers particularly to the fact that the base of the blind hole is heated to such an extent during the welding process that the material of the base is liquefied and in so doing can flow onto the underlying receiving area and connects there the carrier element to the wiper blade adapter while cooling down.

The invention further states that the wiper blade adapter unit comprises at least a second receiving area which likewise has at least one contact surface for mounting a further carrier element. As a result, the wiper blade adapter can be particularly advantageously designed.

In addition, the invention states that the wiper blade adapter unit and the at least one carrier element are fixedly connected to one another by means of a material closure. In this way, particularly the carrier element can be especially advantageously and simply connected to the wiper blade adapter. A "material closure" is particularly to be understood as a connection between two components, in particular the carrier element and the wiper blade adapter, said connection resulting from atomic or molecular forces between the two connection partners.

The invention furthermore proposes that the wiper blade adapter unit and the at least one carrier element are fixedly connected to one another by means of a welded connection. In this way, the carrier element can be connected to the wiper blade adapter in a reliable and durable manner. A "welded connection" is particularly to be understood as a materially bonded connection which is produced by a welding procedure that is considered practical by the person skilled in the art. A "welding procedure" refers particularly to a procedure in which a materially bonded connection is achieved by fusing material of the components to be connected and allowing the fused material to cool down. A melting additive can also be added during the welding procedure in order to provide sufficient material for the fusing operation.

The invention furthermore proposes that the at least one carrier element be joined to the at least one contact surface of the wiper blade adapter unit by means of ultrasonic welding. As a result, the at least one carrier element can be particularly easily and advantageously welded onto the wiper blade adapter. "Ultrasonic welding" refers particularly to a welding procedure in which the required heat for melting the material is achieved by introducing a high frequency, mechanical oscillation, by means of which thermal energy is generated between the components to be connected due to molecular and interfacial friction.

BRIEF DESCRIPTION OF THE DRAWINGS

Further advantages ensue from the following description of the drawings. An exemplary embodiment of the invention is depicted in the drawings. The drawings, the description and the claims contain numerous features in combination. The person skilled in the art will also expediently consider the features individually and put them together to form further useful combinations.

In the drawings.

DETAILED DESCRIPTION

Figure 1:
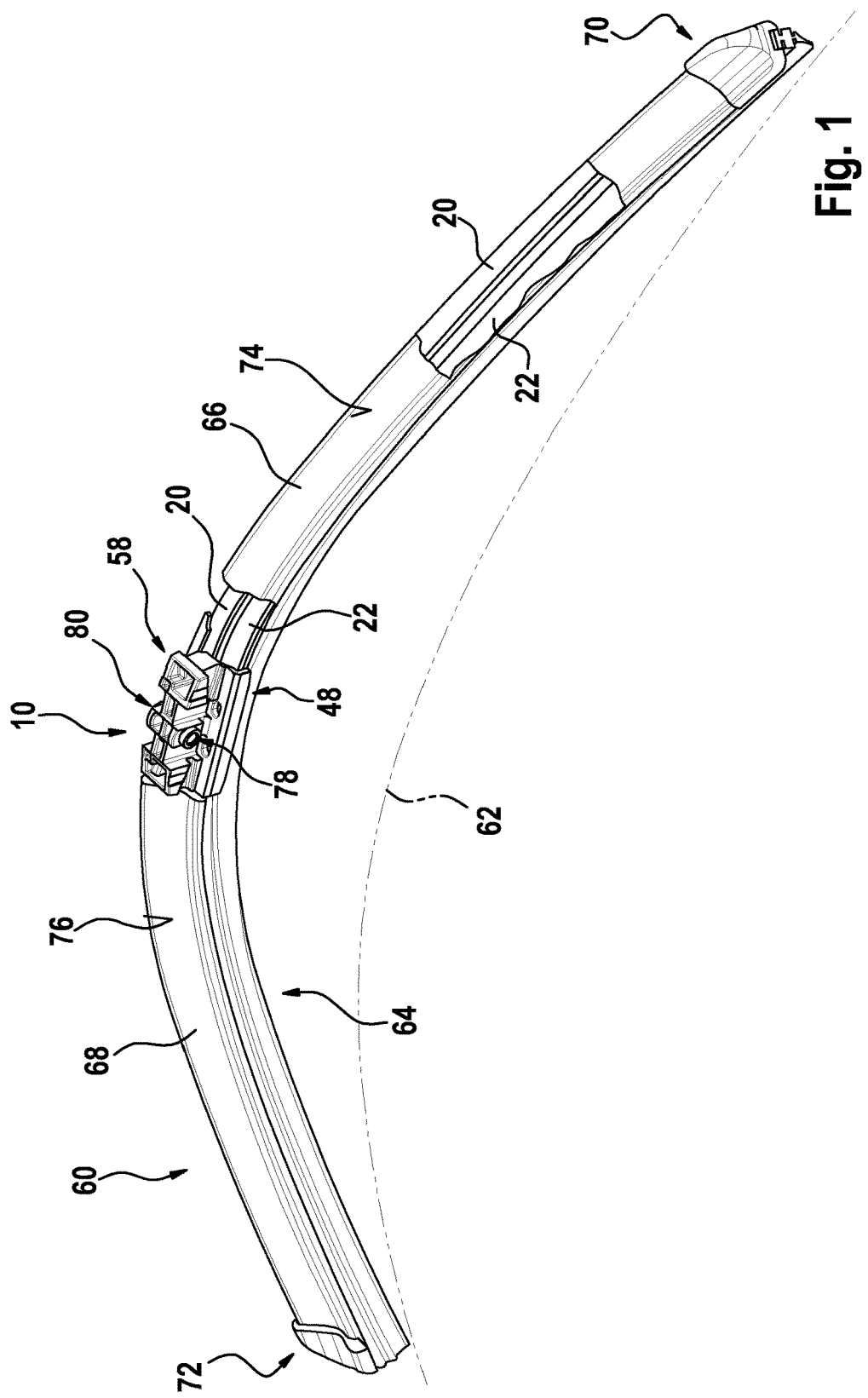
FIG. 1 shows a wiper blade comprising an inventive wiper blade adapter unit in a schematic depiction.

FIG. 1 shows a wiper blade 60 comprising an inventive wiper blade device and an inventive wiper blade adapter unit. The wiper blade 60 is part of a wiper system that is not depicted in detail. The wiper system is provided for wiping a motor vehicle window pane, which is not depicted in detail, in at least one operating state. The motor vehicle window pane has a curvature which is indicated in FIG. 1 and can vary in different regions of the vehicle window pane. The wiper blade 60 is provided for wiping the vehicle window pane. To this end, the wiper blade 60 is connected via a wiper blade adapter 10 to a wiper arm that is not depicted in detail. The wiper system comprises a wiper arm adapter which is not depicted in detail and is fixedly connected to the wiper arm. The wiper blade adapter 10 and the wiper arm adapter are connected to one another such that they can be mechanically separated without causing damage. The wiper blade adapter 10 and the wiper arm adapter can thereby be captively connected to each other by means of a form closure. In principle, it is also conceivable for the wiper blade adapter 10 and the wiper arm adapter to be fixedly connected to each other by means of a force closure or a combination of a form and force closure. In this regard, any embodiments of a connection between the wiper blade adapter 10 and the wiper arm adapter that appear useful to the person skilled in the art are conceivable. The wiper arm is coupled to an actuating drive, such as in particular an electric motor. In an operating state, the actuating drive moves the wiper arm and consequently the wiper blade 60 in a circular movement over the vehicle window pane. It is however also conceivable in this context for the actuating drive to move the wiper blade 60 across the vehicle window pane in a linear movement or along any curved path. The wiper blade device comprises at least one wiper strip 64 which rests on the vehicle window pane in order to wipe the same. In order to distribute and partially build up a bearing force on the wiper strip 64, the wiper blade device comprises two carrier elements 20, 22. The carrier elements 20, 22 have in each case a curvature which is greater than the largest curvature of the vehicle window pane, whereby it is ensured that the wiper strip, in the installed state, rests on the vehicle window pane over the entire length thereof. The carrier elements 20, 22 are furthermore provided for receiving the wiper strip and for fastening the same to the wiper blade 60. The wiper blade 60 has spoiler elements 66, 68 on a side of the carrier elements 20, 22 that faces away from the wiper strip. In so doing, a spoiler element 66, 68 is respectively disposed in the longitudinal direction of the wiper blade 60 between the wiper blade adapter 10 and an end 70, 72. The spoiler elements 66, 68 extend thereby over an entire distance between the wiper blade adapter 10 and the respective end 70, 72 of the wiper blade 60. The spoiler elements 66, 68 comprise respectively a wind deflector surface 74, 76 which, in an installed state on the motor vehicle, points in the direction of the engine hood. The wind deflector surfaces are provided to aerodynamically influence the wiper blade 60 in a positive manner. While driving, a force on the wiper blade 60 in the direction of the vehicle window pane is built up by means of a relative wind being directed by the wind deflector surfaces 74, 76. As a result, the wiper strip 64 is pressed against the vehicle window pane while driving and advantageously cannot lift off said window pane.

Figure 2:
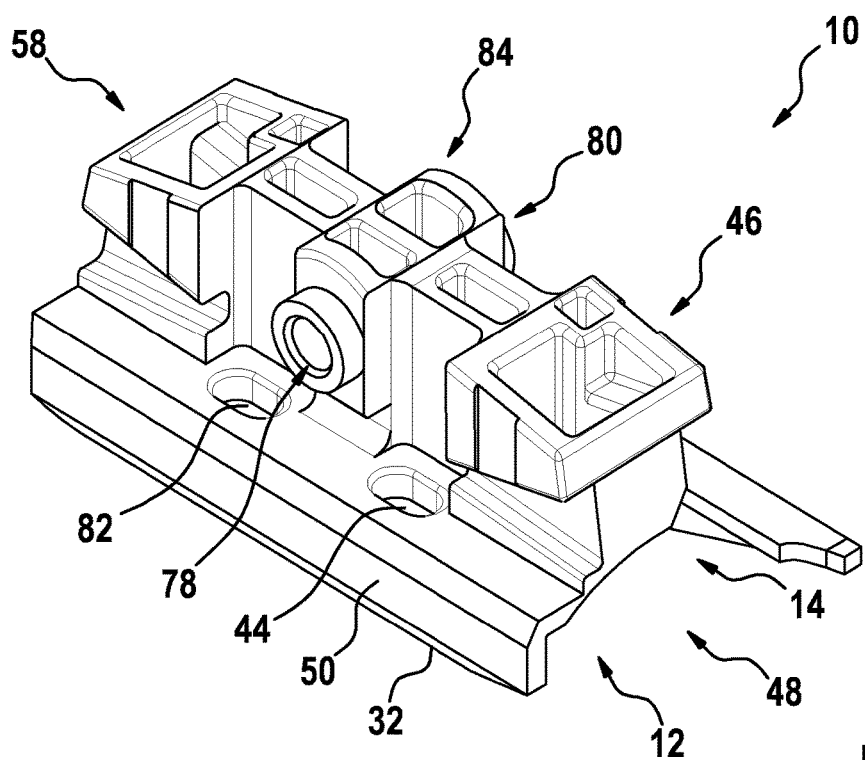
FIG. 2 shows a schematic view of a wiper blade adapter comprising an inventive wiper blade adapter unit.
Figure 3:
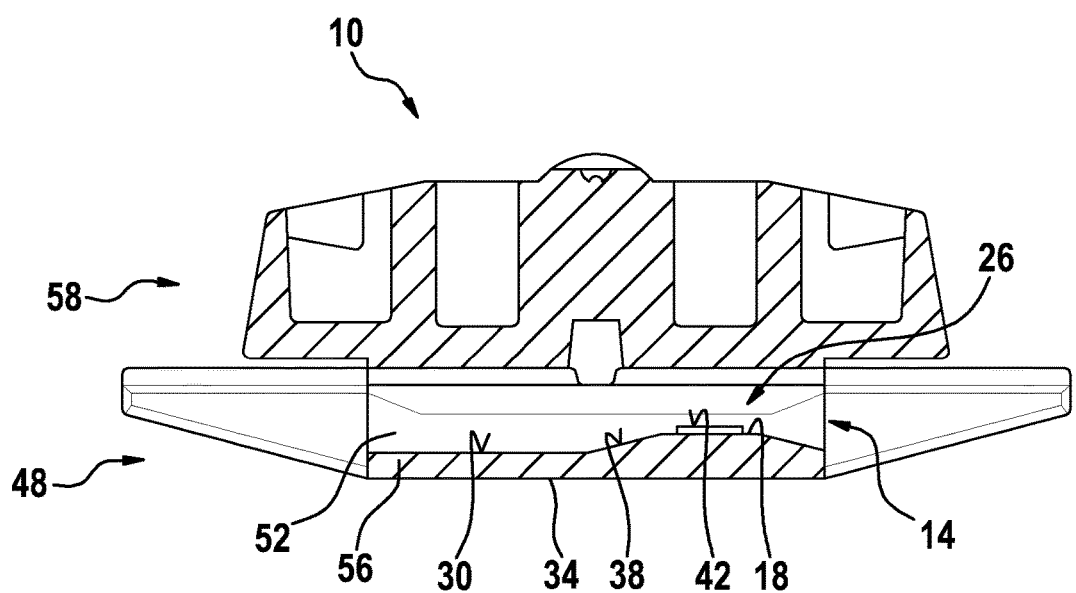
FIG. 3 shows a longitudinal section through an inventive wiper blade adapter comprising an inventive wiper blade adapter unit.
Figure 4:
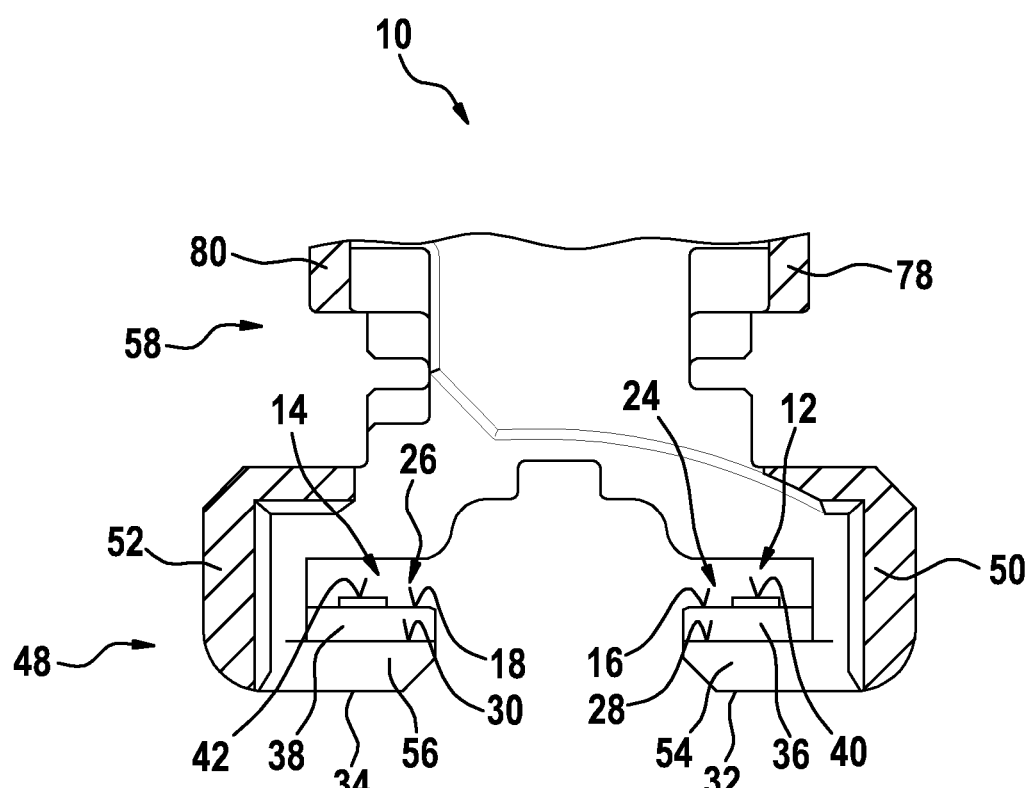
FIG. 4 shows a cross section through an inventive wiper blade adapter comprising an inventive wiper blade adapter unit.

FIGS. 2 and 4 show an inventive wiper blade adapter unit comprising the wiper blade adapter 10 which is provided for connection to the wiper arm adapter. To this end, the wiper blade adapter 10 comprises a connection point for the wiper arm adapter in an upper region. Centrally in the longitudinal direction, the connection point forms respectively a circular receptacle 78, 80 which is oriented towards a side of the wiper blade adapter and is provided to mount the wiper arm adapter in an articulated manner. The wiper blade adapter 10 comprises a first receiving area 12 and a second receiving area 14, which in each case are provided to respectively receive one of the carrier elements 20, 22. The receiving areas 12, 14 are disposed in a lower region 48 of the wiper blade adapter 10, which, in an installed state, faces the vehicle window pane and faces away from a wiper arm adapter. In the lower region 48, the wiper blade adapter 10 is formed by two side walls 50, 52 which extend parallel to a main extension direction of the wiper blade adapter 10. The side walls 50, 52 delimit the wiper blade adapter 10 in each case in the transverse direction. Said side walls 50, 52 have respectively a 90 degree bend inwards at an end that faces the vehicle window pane and faces away from the wiper arm adapter. In so doing, said side walls 50, 52 extend in each case inwards towards each other. An inwardly directed portion 54, 56 of the side walls 50, 52 has respectively a length of approximately 5 mm. The inwardly directed portions 54, 56 of the side walls are spaced apart from each other at a distance which is greater than the length thereof. As a result of the inwardly directed portions 54, 56, the side walls 50, 52 form in each case a U-shape that is tilted by 90 degrees. One of the receiving areas 12, 14 is disposed in each case in the U-shapes that are tilted by 90 degrees and are formed by the side walls 50, 52. A side of the inwardly directed portions 54, 56 of the side walls 50, 52 which faces the vehicle window pane and faces away from the wiper arm adapter forms in each case a bottom side 32, 34 of the wiper blade adapter 10.

Each of the receiving areas 12, 14 has respectively a contact surface 16, 18. The contact surfaces 16, 18 are provided in each case for fastening the respective carrier element 20, 22 of the wiper blade 60. The contact surface 16 is provided for fastening the carrier element 20. The contact surface 18 is provided for fastening the carrier element 22. The contact surfaces 16, 18 are provided to be connected in a materially bonded manner by means of a welding process to the corresponding carrier element 20, 22. The contact surfaces 16, 18 are respectively disposed on a side of the inwardly directed portions 54, 56 of the side walls 50, 52, which side faces away from the vehicle window pane and towards the wiper blade adapter. The contact surfaces 16, 18 have in each case a length, which is approximately a quarter of a length of the receiving area 12, 14. The length of the contact surfaces 16, 18, which extends in each case parallel to the main extension direction of the wiper blade adapter 10, amounts to 7 mm. In principle, it is also possible that the contact surfaces 16, 18 have respectively a maximum length of 15 mm or a maximum length of 20 mm. The carrier elements 20, 22 are fixedly connected to the wiper blade adapter 10 across the length of the contact surfaces 16, 18. A width of the contact surfaces 16, 18 corresponds in each case at least substantially to a width of the respective receiving areas 12, 14. The width thereby corresponds at least to a width of the carrier element 20, 22 that is fastened to the respective contact surface 16, 18, whereby the carrier element 20, 22 rests over the entire width thereof on the contact surface 16, 18. The contact surfaces 16, 18 thereby form a substantially planar surface. In so doing, each of the contact surfaces 16, 18 extends parallel to the corresponding bottom side 32, 34. In principle, it is however also conceivable that the contact surfaces 16, 18 form an inclined, arched or other surface that appears practical to the person skilled in the art.

The receiving areas 12, 14 respectively comprise a plateau 24, 26. The plateaus 24, 26 of the receiving areas 12, 14 are in each case provided for forming the contact surface 16, 18 of the corresponding receiving area 12, 14. The plateaus 24, 26 are respectively configured as a raised portion in the corresponding receiving area 12, 14. The plateaus 24, 26 are respectively disposed on the side of the inwardly directed portions 54, 56 of the side walls 50, 52 that faces away from the vehicle window pane and towards the wiper arm adapter. The plateaus 24, 26 rise in the direction of an upper region 58 of the wiper blade adapter 10. The plateaus are respectively disposed at one end of the respective receiving area 12, 14. In principle, it is also conceivable for the plateaus 24, 26 to be disposed in another portion of the receiving area 12, 14, for instance in the middle of the respective receiving area 12, 14.

Each of the receiving areas 12, 14 comprises a base 28, 30 which differs in the height thereof by 0.9 mm from a height of the contact surface 16, 18. The plateaus 24, 26 have thus a height of 0.9 mm. The bases 28, 30 of the receiving areas 12, 14 are thereby spaced apart from the bottom side 32, 34 at a distance which is less than a distance between the respective contact surfaces 16, 18 and the bottom side 32, 34.

The bases 28, 30 of the receiving areas 12, 14 are connected in each case via an oblique surface 36, 38 to the contact surface 16, 18. The bases 28, 30 transition respectively via the corresponding oblique surface 36, 38, which has respectively a constant gradient, into the contact surfaces 16, 18. In principle, it is also conceivable that the oblique surfaces have another shape which appears practical to the person skilled in the art, for instance an arched shape.

The wiper blade adapter unit comprises two energy directing elements 40, 42. Respectively one energy directing element 40, 42 is disposed on a contact surface 16, 18 of the receiving areas 12, 14. The energy directing element 40 is disposed on the contact surface 16 of the receiving area 12. The energy directing element 42 is disposed on the contact surface 18 of the receiving area 14. Prior to the welding process, the energy directing elements 40, 42 are designed as tapered raised portions. The energy directing elements 40, 42 rise in the direction of an upper region 58 of the wiper blade adapter 10. Said energy directing elements 40, 42 are provided to be partially fused during the welding process. Fused material of said energy directing elements 40, 42 combines with a fused sheathing material of the carrier elements 20, 22 and thereby forms a materially bonded connection after cooling down.

The wiper blade adapter comprises two blind holes 44, 46, which are respectively disposed above one of the contact surfaces 16, 18. The blind holes 44, 46 are designed as elongated holes. The blind holes 44, 46 designed as elongated holes are introduced into the upper region 58 of the wiper blade adapter 10. The blind holes 44, 46 are introduced into the wiper blade adapter 10 on a side that faces the wiper arm adapter in the installed state. Said blind holes 44, 46 are in each case introduced into the wiper blade adapter 10 in a region which lies directly above an end of the respective receiving area 12, 14 whereat the corresponding plateau 24, 26 is disposed from which the corresponding contact surface 16, 18 is formed. Said blind holes 44, 46 are in each case approximately in alignment with the energy directing element 40, 42 that is disposed on the corresponding contact surface 16, 18. A base of the wiper blade adapter 10 that delimits the blind holes 40, 42 is respectively provided for the purpose of being fused during the welding process. A material of the base of the wiper blade adapter 10 which delimits the respective blind hole 44, 46 liquefies during the welding process and flows onto the corresponding carrier element 20, 22 which is disposed for welding in the corresponding receiving area 12, 14. The fused material of the base of the corresponding blind hole 44, 46 combines with the fused sheathing material of the carrier elements 20, 22 and in so doing forms a materially bonded connection after said fused materials have cooled down. The wiper blade adapter unit comprises respectively one further, additional blind hole 82, 84 that is configured as an elongated hole above each receiving area 12, 14. The additional blind holes 82, 84 are disposed above the base 28, 30 of the respective receiving area 12, 14. The additional blind holes 82, 84 are displaced in the longitudinal direction parallel to the blind holes 44, 46 configured as elongated holes.

In order to join the carrier elements 20, 22 to the wiper blade adapter 10, said carrier elements 20, 22 are initially loosely inserted with a region provided therefore into the respective receiving area 12, 14. The carrier elements 20, 22 respectively rest on the corresponding energy directing element 40, 42 that is disposed on the corresponding contact surface. The carrier elements 20, 22 are now joined to the corresponding contact surface of the receiving regions of the wiper blade adapter unit by means of ultrasonic welding. After the carrier elements 20, 22 have been inserted, a sonotrode is introduced for this reason from above into each of the blind holes 44, 46 designed as elongated holes. The sonotrodes introduce respectively a high frequency, mechanical oscillation into the blind hole 44, 46. Due to the heat ensuing therefrom, the material of the base delimiting the blind holes 40, 42 melts. If the material of the base of the wiper blade adapter 10, which base delimits the blind holes 40, 42, is fused, the sonotrode hits the carrier element 20, 22 which lies thereunder. The sonotrodes now induce the high frequency, mechanical oscillation into the corresponding carrier element 20, 22, whereby a thermal energy arises between the corresponding energy directing element 40, 42 and the carrier element 20, 22 due to molecular and interfacial friction, said energy fusing the material of the corresponding energy directing element 40, 42 and the material of the sheathing of the corresponding carrier element 20, 22. The energy directing elements 40, 42 are thereby partially or entirely fused. After the material has been fused, the sonotrodes are removed and the material hardens due to cooling. The carrier elements 20, 22 are now connected respectively on a side facing the bottom sides 32, 34 and on a side facing away from the bottom sides 32, 34 to the wiper blade adapter 10 in a materially bonded manner.

What is claimed is:

1. A wiper blade adapter unit with a wiper blade adapter (10), which is configured to be connected to a wiper arm adapter and which has at least one receiving area (12, 14) having at least one contact surface (16, 18) configured for fastening at least one carrier element (20, 22) of a wiper blade, characterized in that the at least one contact surface (16, 18) has a maximum length of 20 mm.

2. The wiper blade adapter unit according to claim 1, characterized in that the at least one contact surface (16, 18) has a maximum length of 15 mm.

3. The wiper blade adapter unit according to claim 1, characterized in that the at least one contact surface (16, 18) has a maximum length of 7 mm.

4. The wiper blade adapter unit according to claim 1, characterized in that the at least one receiving area (12, 14) comprises a plateau (24, 26) forming the at least one contact surface (16, 18).

5. The wiper blade adapter unit according to claim 4, further comprising at least one energy directing element (40, 42) which is disposed on the contact surface (16, 18).

6. The wiper blade adapter unit according to claim 1, characterized in that the at least one receiving area (12, 14) has a base (28, 30) which differs in a height thereof by at least 0.5 mm from a height of the at least one contact surface (16, 18).

7. The wiper blade adapter unit according to claim 6, characterized in that the base (28, 30) of the at least one receiving area (12, 14) is spaced apart from a bottom side (32, 34) of the wiper blade adapter (10) at a distance which is less than a distance between the at least one contact surface (16, 18) and the bottom side (32, 34).

8. The wiper blade adapter unit at least according to claim 6, characterized in that the base (28, 30) of the at least one receiving area (12, 14) is connected via an oblique surface (36, 38) to the at least one contact surface (16, 18).

9. The wiper blade adapter unit according to claim 1, characterized in that the length of the at least one contact surface (16, 18) is at least substantially a quarter of a length of the at least one receiving area (12, 14).

10. The wiper blade adapter unit according to claim 1, characterized in that the at least one contact surface (16, 18) has a width that corresponds at least substantially to a width of the at least one receiving area (12, 14).

11. The wiper blade adapter unit according to claim 1, characterized by at least one energy directing element (40, 42) which is disposed on the contact surface (16, 18).

12. The wiper blade adapter unit according to claim 11, characterized in that the at least one energy directing element (40, 42) is configured to be at least partially fused to the at least one carrier element (20, 22) during a welding process.

13. The wiper blade adapter unit according to claim 1, characterized in that the wiper blade adapter (10) comprises at least one blind hole (44, 46) which is disposed above the at least one contact surface (16, 18).

14. The wiper blade adapter unit according to claim 13, characterized in that the at least one blind hole (44, 46) is designed as an elongated hole.

15. The wiper blade adapter unit at least according to claim 13, characterized in that a base delimiting the at least one blind hole (44, 46) is configured to be fused to the at least one carrier element (20, 22) during a welding process.

16. The wiper blade adapter unit according to claim 1, characterized by at least one second receiving area (12, 14) which likewise has at least one contact surface (16, 18) which is provided for mounting at least one further carrier element (20, 22).

17. A wiper blade device comprising a wiper blade adapter unit according to claim 1 and at least one carrier element (20, 22) fastened to the adapter unit.

18. The wiper blade device according to claim 17, characterized in that the wiper blade adapter unit and the at least one carrier element (20, 22) are fixedly connected to one another by means of a materially bonded connection.

19. The wiper blade device according to claim 18, characterized in that the wiper blade adapter unit and the at least one carrier element (20, 22) are fixedly connected to one another by means of a welded connection.

20. The wiper blade device according to claim 19, characterized in that the at least one carrier element (20, 22) is joined to the at least one contact surface (16, 18) of the wiper blade adapter unit by means of an ultrasonic welding process.

21. A wiper blade comprising a wiper blade device according to claim 17.

* * * * *